United States Patent
Sixsou et al.

(10) Patent No.: US 8,538,205 B2
(45) Date of Patent: Sep. 17, 2013

(54) MULTI-FUNCTION SUMMING MACHINE

(75) Inventors: Emmanuel Sixsou, Jerusalem (IL); Mois Navon, Efrat (IL)

(73) Assignee: Mobileye Technologies Ltd., Nicosia (CY)

( * ) Notice: Subject to any disclaimer, the term of this patent is extended or adjusted under 35 U.S.C. 154(b) by 385 days.

(21) Appl. No.: 12/779,976

(22) Filed: May 14, 2010

(65) Prior Publication Data
US 2011/0280495 A1 Nov. 17, 2011

(51) Int. Cl.
*G06K 9/60* (2006.01)
*G06K 9/00* (2006.01)
*G06K 9/40* (2006.01)

(52) U.S. Cl.
USPC ............ 382/304; 382/104; 382/274; 382/308

(58) Field of Classification Search
USPC .......................................... 382/104, 304, 274
See application file for complete search history.

(56) References Cited

U.S. PATENT DOCUMENTS

| | | | |
|---|---|---|---|
| 4,550,437 A * | 10/1985 | Kobayashi et al. ........... | 345/505 |
| 5,163,133 A * | 11/1992 | Morgan et al. .................. | 712/21 |
| 5,206,628 A * | 4/1993 | Kelleher ....................... | 345/606 |
| 5,504,931 A * | 4/1996 | Furtek .............................. | 712/17 |
| 5,506,801 A * | 4/1996 | Tawel ............................ | 708/801 |
| 5,513,282 A * | 4/1996 | Williams ....................... | 382/303 |
| 5,640,578 A * | 6/1997 | Balmer et al. ................. | 712/221 |
| 5,715,334 A * | 2/1998 | Peters ............................ | 382/254 |
| 6,307,588 B1 * | 10/2001 | Olson et al. ................. | 348/222.1 |
| 7,483,053 B2 * | 1/2009 | Silverbrook ................ | 348/207.2 |
| 7,566,851 B2 * | 7/2009 | Stein et al. ..................... | 250/205 |
| 7,697,610 B2 * | 4/2010 | Yu et al. ..................... | 375/240.16 |
| 7,889,922 B2 * | 2/2011 | Fluck et al. .................... | 382/168 |
| 8,165,401 B2 * | 4/2012 | Funayama et al. ............ | 382/190 |
| 2008/0137908 A1 * | 6/2008 | Stein et al. ..................... | 382/103 |
| 2009/0040367 A1 * | 2/2009 | Zakrzewski et al. .......... | 348/370 |
| 2011/0116713 A1 * | 5/2011 | Zeng et al. .................... | 382/167 |

* cited by examiner

*Primary Examiner* — Utpal Shah
(74) *Attorney, Agent, or Firm* — The Law Office of Michael E. Kondoudis

(57) ABSTRACT

A system for processing an image including multiple pixels and intensity data thereof. An image memory is adapted for storing the image. An arithmetic core is connectible to the image memory and adapted for inputting the intensity data. The arithmetic core includes a multiple function processing units. One or more of the function processing units includes (i) a processing core adapted for computation of a function of the intensity data and for producing results of the computation, (ii) a first and (iii) a second accumulator for summing the results; and storage adapted to store the results. The function processing units are configured to compute the functions in parallel and sum the results simultaneously for each of the pixels in a single clock cycle.

19 Claims, 6 Drawing Sheets

MULTI-FUNCTION SUMMING MACHINE

BACKGROUND

1. Field

The present invention relates to image processing systems and specifically to a system for calculating functions of intensity and summing the functions over an image frame.

2. Related Art

Image processing often requires performing a specified function over every pixel x of a given image and then summing results of the function for the pixels (i.e., $\Sigma f[x]$). Typical examples of functions $f[x]$ required in processing of pixels in an image are sum of the intensity squared or the sum of intensity gradients. Such calculations are computationally intensive since conventional circuitry typically reads through the entire image for each summation of every desired function. Sometimes an area of an image known as a "window" is specified and used to obtain function values of a specified function $f[x]$ over the window. Accumulation and storage of multiple function values is typically performed with multiple passes through the image window. During each pass, intensity data is read from the pixels, and each particular function is calculated during each a unique pass through the window. Results of the functions are accumulated in local memory cells for each window.

Reference is now made to FIG. 1 (conventional art) and FIG. 2 (conventional art), which illustrate a driver assistance system 16 including a camera or image sensor 12 mounted in a vehicle 18 imaging a field of view in the forward or rearward direction. Image sensor 12 typically captures images in real time in a time series of image frames 15. An image processor 14 is used to process image frames 15 to perform one of a number of driver assistance systems.

During the last few years camera based driver assistance systems (DAS) 16 have been entering the market; including lane departure warning (LDW), Automatic High-beam Control (AHC), traffic sign recognition (TSR) and forward collision warning (FCW). Lane departure warning (LDW) systems are designed to give a warning in the case of unintentional lane departure. The warning is given when the vehicle crosses or is about to cross the lane marker. Driver intention is determined based on use of turn signals, change in steering wheel angle, vehicle speed and brake activation. There are various LDW systems available. One algorithm for lane departure warning (LDW) used by the assignee (Mobileye Technologies Ltd., Nicosia, Cyprus, hereinafter "Mobileye") of the present application is predictive in that it computes time to lane crossing (TLC) based on change in wheel-to-lane distance and warns when the time-to-lane crossing (TLC) is below a certain threshold. Typically, the lane markers are detected in the camera image and then, given the known camera geometry and camera location relative to the vehicle, the position of the vehicle relative to the lane is computed. The lane markers detected in the camera image are then collected over time, for instance using a Kalman filter.

The core technology behind forward collision warning (FCW) systems and headway distance monitoring is vehicle detection. Assume that reliable detection of vehicles in a single image a typical forward collision warning (FCW) system requires that a vehicle image be 13 pixels wide, then for a car of width 1.6 m, a typical camera (640×480 resolution and 40 deg FOV) gives initial detection at 115 m and multi-frame approval at 100 m. A narrower horizontal field of view (FOV) for the camera gives a greater detection range however; the narrower horizontal field of view (FOV) will reduce the ability to detect passing and cutting-in vehicles. A horizontal field of view (FOV) of around 40 degrees was found by Mobileye to be almost optimal (in road tests conducted with a camera) given the image sensor resolution and dimensions. A key component of a typical forward collision warning (FCW) algorithm is the estimation of distance from a single camera and the estimation of scale change from the time-to-contact/collision (TTC) as disclosed for example in U.S. Pat. No. 7,113,867.

Traffic sign recognition (TSR) modules are designed typically to detect speed limit signs and end-of-speed limit signs on highways, country roads and urban settings. Partially occluded, slightly twisted and rotated traffic signs are preferably detected. Systems implementing traffic sign recognition (TSR) may or should ignore the following signs: signs on truck/buses, exit road numbers, minimum speed signs, and embedded signs. A traffic sign recognition (TSR) module which focuses on speed limit signs does not have a specific detection range requirement because speed limit signs only need to be detected before they leave the image. An example of a difficult traffic sign to detect is a 0.8 meter diameter traffic sign on the side of the road when the vehicle is driving in the center lane of a three lane highway. Further details of a TSR system is disclosed by the present assignee in U.S. Patent Publication No. 2008/0137908.

Given that forward collision warning (FCW), traffic sign recognition (TSR) and lane departure warning (LDW) already require a high resolution monochrome sensor, a new automatic high-beam control (AHC) algorithm was developed for use with high resolution monochrome sensors as disclosed in U.S. Pat. No. 7,566,851. A number of different pattern recognition techniques are used with higher resolution monochrome imaging sensors to identify light sources instead of relying on color information. The automatic high-beam control (AHC) algorithm includes the following features: Detect bright spots in the sub-sampled long exposure image and then perform clustering and classification in the full resolution image, classify spots based on brightness, edge shape, internal texture, get further brightness information from the short exposure frames and classify obvious oncoming headlights based on size and brightness, track spots over time and compute change in size and brightness, pair up matching spots based on similarity of shape, brightness and motion, classify pairs as oncoming or taillights based on distance, brightness and color, and estimate distance and where unmatched spots might be motorcycles taillights.

Thus, there is a need for and it would be advantageous to have a multifunction summing machine to enable "bundling" of multiple driver assistance systems (e.g. automatic high-beam control (AHC) and traffic sign recognition (TSR), lane departure warning (LDW), forward collision warning (FCW)) on a single hardware platform, e.g. camera and processor. Bundling provides cost reduction and may allow more driver assistance functions to be added to the vehicle without increasing the space required beyond the windshield of the vehicle.

The terms "frame" or "image frame" as used herein is one of a sequence of pictures as output from a camera, typically a video camera. The terms "window" or "image window" as used herein is a portion of an image frame or the same portion over multiple image frames.

BRIEF SUMMARY

According to an embodiment of the present invention there is provided a system for processing an image frame. The image frame includes multiple pixels and intensity data thereof. An image memory is adapted for storing the image frame. An arithmetic core is connectible to the image memory and adapted for inputting the intensity data. The arithmetic core includes multiple function processing units for parallel processing of the intensity data. One or more of the function processing units includes: (i) a processing core adapted for computation of a function of the intensity data and for producing a result of the computation, (ii) a first and optionally (iii) a second accumulator for summing the result. The function processing units are configured to compute the functions in parallel and sum the results simultaneously for each of the pixels in a single clock cycle. Storage may be attached to the arithmetic core for storing the result. The first accumulator and the second accumulator may be connected so that the result of the first accumulator is input into the second accumulator. An output of the second accumulator becomes a final result. The processing core is configured to perform the computation of the functions in one or more windows of the image frame. The function processing units are configured to compute the functions in parallel. A control module is connectible to the arithmetic core. The control module is adapted to specify the functions to be processed respectively in different windows of the image frame. The control module may be adapted to specify the different windows of the image frame. The control module may have an operation mode bit adapted to select window size and the different windows may be different sizes. The control module may be adapted to specify overlap between the different windows.

According to another aspect of the present invention there is provided a method for processing an image frame in a system including an image memory storing an image frame. The image frame includes multiple pixels and intensity data. Multiple image windows are specified. During a single read of the intensity data of the image frame, multiple functions of the intensity data are summed in the respective image windows. The functions are calculated while incrementing over the pixels of the image window. The calculation of the functions is performed in parallel for each of the pixels in a single clock cycle and the summation of the functions is performed simultaneously. For each of the functions, a result of the calculation may be accumulated in a first accumulator. Upon reaching an edge of the image window the result may be input into a second accumulator. When all the pixels of the image window are read and the function is calculated, the final result may be stored for the image window. The image windows are optionally of different size and optionally overlap. The final results from the multiple calculations are typically available at the same time to multiple driver assistance systems. Typically, there are multiple image windows of different size and/or the image windows overlap.

According to the present invention there is provided a system for processing an image adapted for performing the above method. The system includes an arithmetic core connectible to the image memory and adapted for inputting the intensity data. The arithmetic core includes multiple function processing units and one or more accumulators. The function processing units each include: a processing core adapted for respective computations of the functions of the intensity data to produce results of the computations. The accumulator(s) is adapted for summing the results of the computations.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

The invention is herein described, by way of example only, with reference to the accompanying drawings, wherein.

Figure 1:
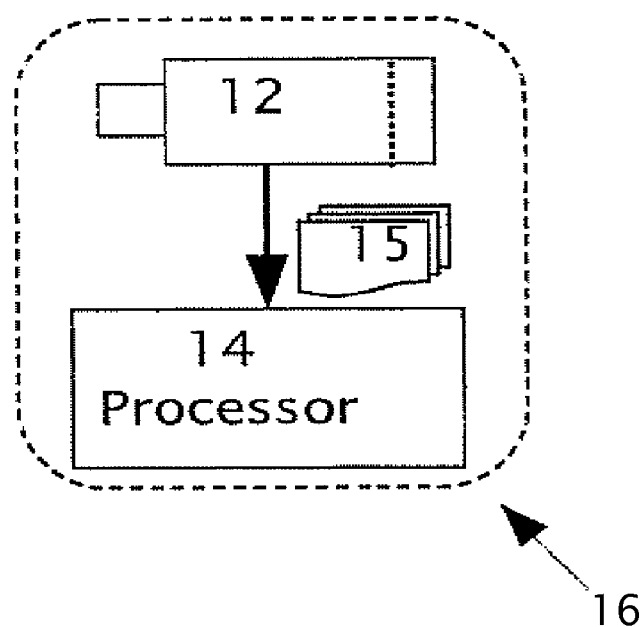
FIG. 1 is a drawing illustrating a conventional imaging system.
Figure 2:
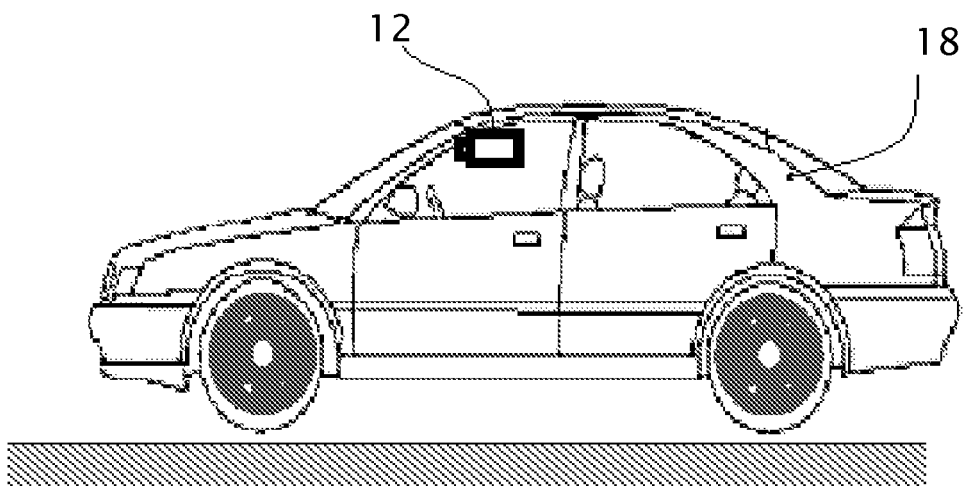
FIG. 2 is a drawing of the imaging system of FIG. 1 mounted in a vehicle.

The foregoing and/or other aspects will become apparent from the following detailed description when considered in conjunction with the accompanying drawing figures.

DETAILED DESCRIPTION

Reference will now be made in detail to embodiments of the present invention, examples of which are illustrated in the accompanying drawings; wherein like reference numerals refer to the like elements throughout. The embodiments are described below to explain the present invention by referring to the figures.

By way of introduction, according to a feature of the present invention, specified functions are calculated in parallel by inputting intensity data of pixels of an image frame, summing over window(s) of interest and the resulting sums are stored in separate local memory cells. According to another aspect of the present invention, different image windows may be defined for calculation of the distinct functions. The different windows may be of different size, shape and/or position in the image frame. According to yet another aspect of the present invention, the image windows used for calculation of the distinct functions may overlap. Hence, according to a feature of the present invention the image data is input once only, regardless of how many functions are being calculated and summed and regardless of the number, size and overlap of the image windows. The multifunction summing machine according to features of the present invention is adapted for bundling of multiple driver assistance application and may be similarly applied to other parallel digital signal processing applications.

Figure 3:
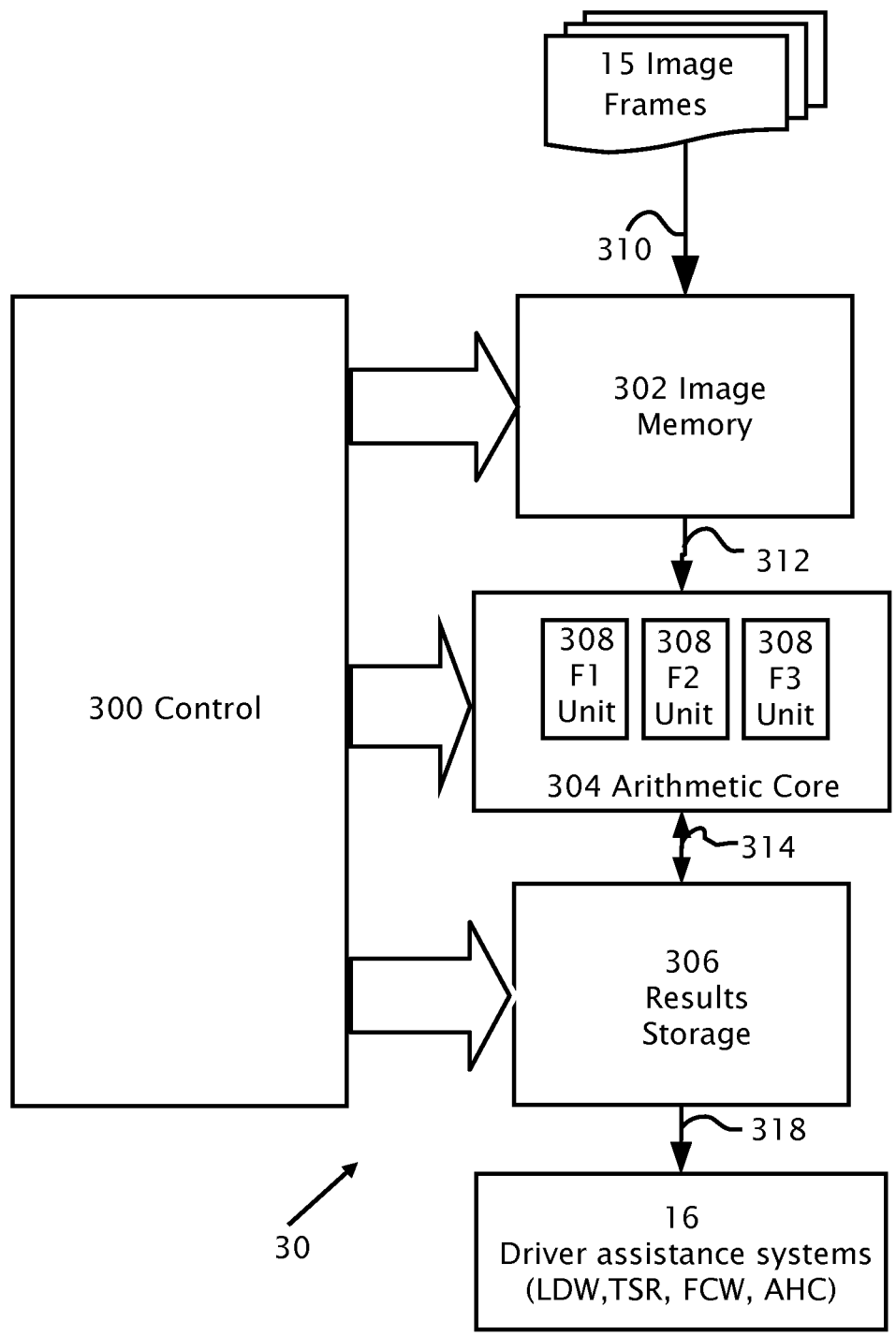
FIG. 3 is a block diagram of multifunction summing machine (MFSM) according to an embodiment of the present invention.

Reference is now made to FIG. 3, which illustrates a block diagram of a multifunction summing machine (MFSM) 30 according to an embodiment of the present invention. MFSM 30 has a control module 300 which is used to control an image memory 302, an arithmetic core 304 and results storage 306. Image memory 302 has an input 310 which receives image frames 15 from camera 12. Image memory 302 typically stores locally image frames 15. Image frame data is accessible to arithmetic core 304 through interface 312. Arithmetic core 304 includes multiple function processing units 308. Function processing units 308 typically perform distinct processes over the images. Typical examples of processes performed by function processing units 308 over pixels in image frames 15 are the sum of the intensity squared or the sum of the intensity gradients. FIG. 3 shows three function processing units 308, however, there is no limitation as to how many function processing units 308 that may be implemented. Results storage 306 is optionally connected to arithmetic core 304 with a bidirectional interface 314. Results storage 306 stores and accumulates the results calculated by function processing units 308. An output 318 of results storage 306 is by way of example used by one or more driver assistance system(s) 16 to process image frames 15 to perform one or more driver assistance functions using a single camera 12.

Figure 4:
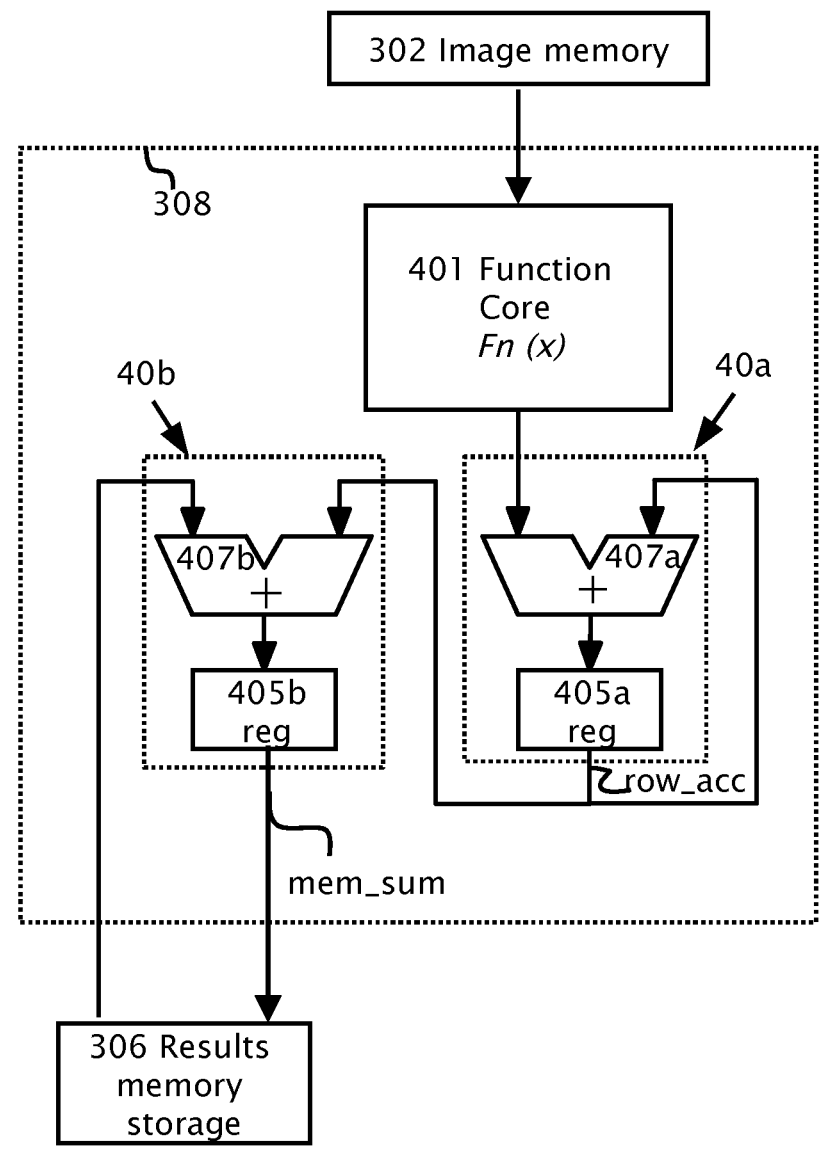
FIG. 4 shows in greater detail the elements of a function processing unit in an embodiment of the present invention.

Reference is now made to FIG. 4, which shows in greater detail the elements of function processing unit 308 in embodiments of the present invention. Function processing unit 308 includes a function core block 401 which performs the desired function, $F_n(x)$ (e.g. sum of intensity squared). An accumulator 40a, which includes an adder 407a, accumulates an intermediate result, row_acc, in a register 405a. A second accumulator 40b, which includes an adder 407b and a register 405b, is used to add row_acc (the result of accumulator 40a) with a result previously stored in results storage 306. The result, mem_sum from register 405b is then stored in the results storage 306. When multiple functions are calculated in parallel, function processing unit 308 is duplicated for each function being calculated and all functions core units 308 preferably have their generated results available at the same time. The storage in results memory storage 306 may take place sequentially.

Figure 5:
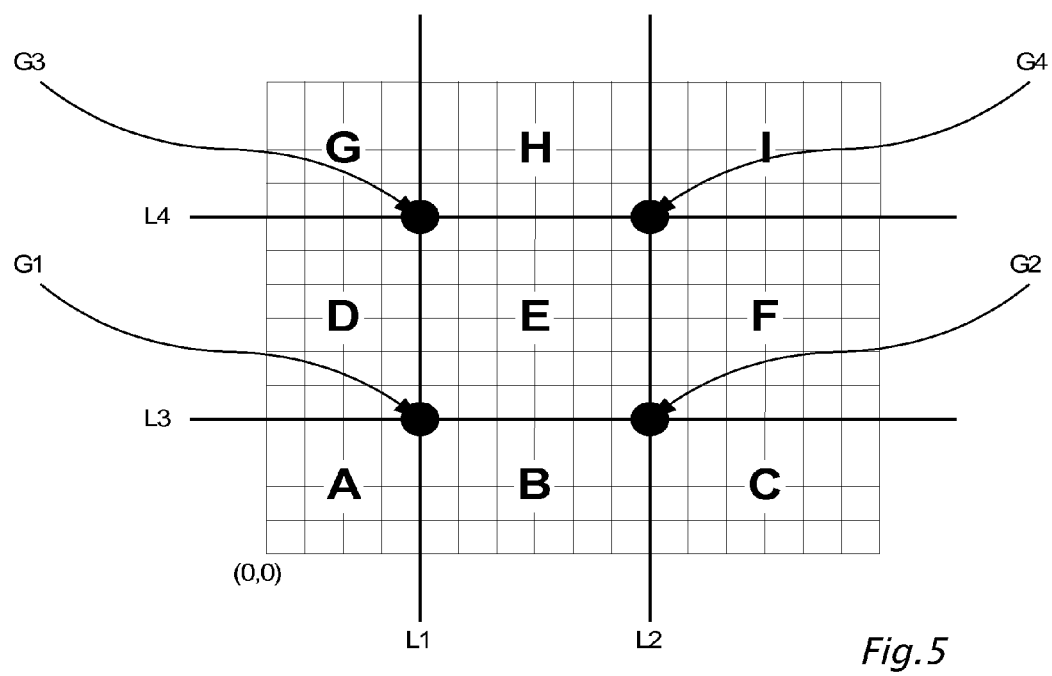
FIG. 5 shows how an image is divided into grid points and windows in an embodiment of the present invention.

Reference is now made to FIG. 5, which illustrates an aspect of the present invention. In FIG. 5, a given image is divided, for example, into 9 windows (A-I) by lines (L1-L4). Lines L1-L4 are divided by grid points (G1-G4). The grid points (G1-G4) define the windows A, B, D, E which are the input image data used by the function processing units 308. An operation mode bit (referred to herein as the S (small)/L (large) mode bit) optionally supplied by control module 300, determines whether the function processing units 308 calculate function sums for small (S) windows or large (L) windows. For G1 there is only a small window available i.e. window A; for G2 there is a small window of B or a large window of A and B combined; for G3 there is a small window of D or a large window of A and D combined; and for G4 there is a small window of E or a large window of A, B, D, E combined. When the operation mode bit is set to "small (S)", the core returns the summed function output for the small windows related to grid points (G1-G4) i.e. the summed function results of windows A, B, D, E respectively. When the operation mode bit is set to "large (L)", the core returns the summed function outputs for the large windows related to grid points (G1-G4) i.e. the summed function results of windows A, A+B, A+D, A+B+D+E respectively. The resultant values associated with grid points (G1-G4) are stored in their own separate memory locations in results memory storage 306. So for example, assuming MFSM 30 with three unique function processing units 308: F1, F2, F3, and small windows selected, a portion of results memory storage 306 may appear as shown in Table 1.

TABLE 1

| Grid Point | Address | Data |
|---|---|---|
| G1 | 0 | F1(A) |
| G1 | 1 | F2(A) |
| G1 | 2 | F3(A) |
| G2 | 3 | F1(B) |
| G2 | 4 | F2(B) |
| G2 | 5 | F3(B) |
| G3 | 6 | F1(D) |
| G3 | 7 | F2(D) |
| G3 | 8 | F3(D) |
| G4 | 9 | F1(E) |
| G4 | 10 | F2(E) |
| G4 | 11 | F3(E) |

Figure 6A:
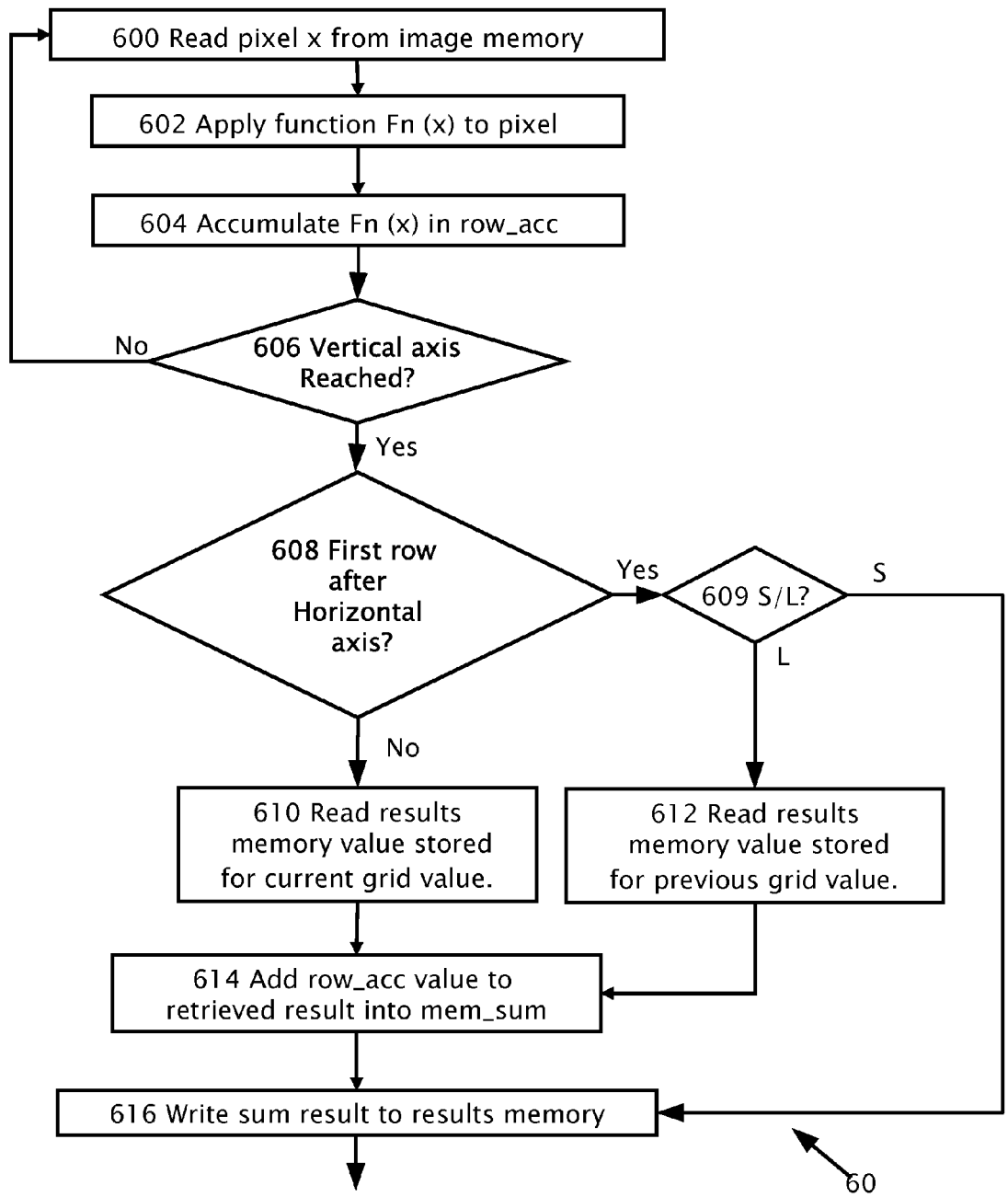
FIGS. 6a and 6b show a flow chart of a method to use the MFSM to determine the results of function processing units being applied to multiple windows for an image frame stored in image memory in an embodiment of the present invention.
Figure 6B:
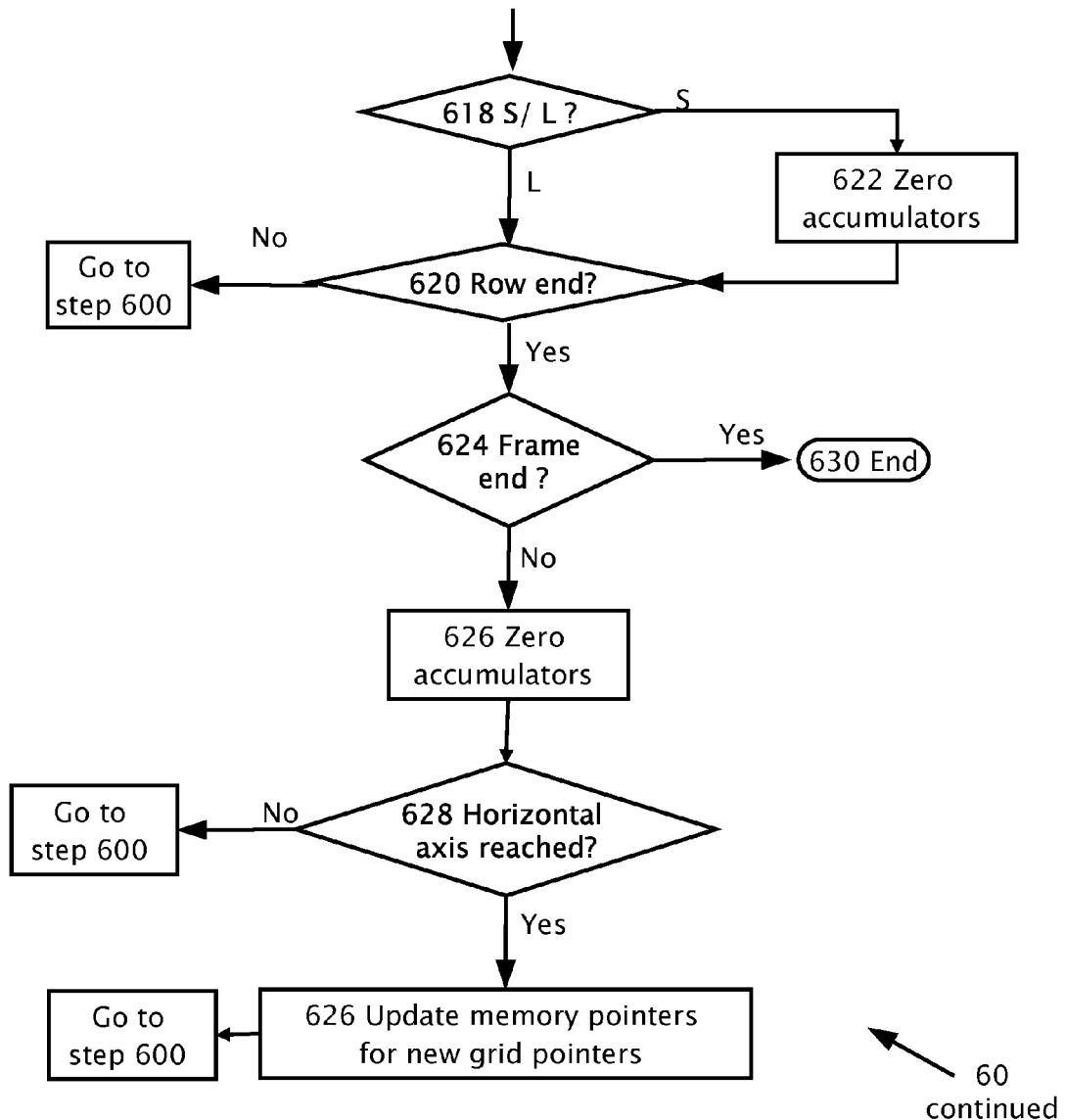

Reference is now made to FIGS. 6a and 6b, which show a flow chart 60 of a method, according to embodiments of the present invention for using MFSM 30 applied to multiple windows for image frame 15 stored in image memory 302. Starting at the origin (0,0) shown in FIG. 5, the first pixel x is read (step 600) from image memory 302. Control module 300 then applies each pixel to each of the function processing units 308 (step 602) and accumulates (step 604) the result (row_acc) of each applied function in registers 405a for each function. A check is made in decision box 606 to see if a vertical grid line (e.g. axis L1) has been reached. If vertical grid line (e.g. axis L1) has not been reached (decision box 606) steps 600 to 604 are repeated. Once a vertical axis has been reached a check is made (decision box 608) to see if the present row is positioned above a horizontal grid axis (e.g. L3). If the present row is not above a horizontal grid axis, the result that is in memory storage 306 for the present grid value is read into adder 407b (step 610). If the present row is just above the horizontal grid axis, then a check is made (decision box 609) to determine if the mode bit is set to S (small) or L (large). In the case that large windows are being calculated, the result that is in memory storage 306 for the previous grid value is read into adder 407b (step 612). Adder 407b adds the result from either the previous or present grid value with the accumulated result (row_acc) of each applied function in register 405a (step 614). The result of the addition in step 614 is stored in the results memory storage 306 (step 616). For small window calculations, no stored value is of relevance and the accumulated result (row_acc) is written to memory (step 616).

Using the previous example of three function calculations in parallel, the three results stored in memory storage 306 (step 616) are: F1(A), F2(A), F3(A) with reference to grid point G1. Continuing flow chart 60 on FIG. 6b, a check is made in decision box 618 to see if the mode bit is set by control module 300 to either S (small) or L (large). If the mode bit is set to S then the accumulated results of registers 405a (row_acc) and 405b (mem_sum) are set to zero (step 622) and then a check is made to see an end of row has been reached (decision box 620). If the mode bit is set to L then the check is made in decision box 620 to see if an end of row has been reached without zeroing the accumulators. If an end of row has not been reached the process resumes at step 600. If row end has been reached, a check is then made in decision box 624 to see if the end of the image frame has been reached. If the end of the frame has been reached then the MFSM 30 is ready to process the next image frame in image memory 302. Otherwise the accumulated results of registers 405a (row_acc) and 405b (mem_sum) are set to zero (step 626) and a check is made (decision box 628) to see if a horizontal grid axis has been reached. If the horizontal grid axis has not been reached then the process resumes at step 600. Otherwise, the memory pointers are updated by the control module 300 for new grid pointers (step 626) and the process resumes at step 600.

Examples of various features/aspects/components/operations have been provided to facilitate understanding of the disclosed embodiments of the present invention. In addition, various preferences have been discussed to facilitate understanding of the disclosed embodiments of the present invention. It is to be understood that all examples and preferences disclosed herein are intended to be non-limiting.

Although selected embodiments of the present invention have been shown and described individually, it is to be understood that at least aspects of the described embodiments may be combined.

Also although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof.

The invention claimed is:

1. A system for processing an image frame including a plurality of pixels and intensity data thereof, the system comprising:
   an image memory adapted for storing the image frame; and
   an arithmetic core connectible to said image memory and adapted for inputting the intensity data, said arithmetic core including a plurality of function processing units configured to perform distinct processes over the image frame;
   wherein said function processing units include:
      (i) a processing core adapted for computation of a function of the intensity data and for producing a result of said computation;
      (ii) an accumulator for summing said result;
   a plurality of registers; and
   a control module operatively connectible to said arithmetic core, wherein said control module is configured for said distinct processes to apply the pixels to the function processing units and to accumulate respectively said results of said computations in said registers.

2. The system, according to claim 1, wherein said function processing units are configured to compute said functions in parallel and sum said results simultaneously for each of the pixels in a single clock cycle.

3. The system according to claim 1, further comprising storage operatively attached to said arithmetic core and adapted to store said result.

4. The system according to claim 1, wherein said accumulator is a first accumulator, wherein said function processing units further include a second accumulator, and wherein said accumulator and said second accumulator are connected so that said result of said accumulator is input into said second accumulator.

5. The system according to claim 4, wherein an output of said second accumulator becomes a final result.

6. The system according to claim 1, wherein said processing core is configured to perform said computation of said function in a window of the image frame.

7. The system according to claim 1, wherein said function processing units are configured to compute said functions in parallel.

8. The system according to claim 7, wherein said control module is adapted to specify said functions to be processed respectively in different windows of the image frame.

9. The system according to claim 8, wherein said control module is adapted to specify said different windows of the image frame.

10. The system according to claim 8, wherein said control module has an operation mode bit adapted to select window size and wherein said different windows are of different size.

11. The system according to claim 8, wherein said control module is adapted to specify overlap between said different windows.

12. The system of claim 1, wherein the distinct processes performed over the image frame include different said functions.

13. A method for processing an image frame including a plurality of pixels and intensity data thereof, in a system including an image memory adapted to store the image frame, a plurality of registers, and plurality of function processing units, wherein said function processing units include: a processing core adapted for computation of a function of the intensity data, and for producing a result of the computation and an accumulator for summing the result, the method comprising:
   specifying an image window in the image frame;
   during a single read of the intensity data of the image frame:
      applying the pixels to the function processing units;
      summing said results of the computations in the registers while incrementing over the pixels of the image window, wherein the functions perform distinct processes over the image window,
   wherein the computations are performed in parallel for each of the pixels in a single clock cycle and said summing of said functions is performed simultaneously.

14. The method according to claim 13, wherein, for each of said functions, said summing is performed by:
   (i) first accumulating in a first accumulator said result of said computation,
   (ii) upon reaching an edge of the image window inputting said result into a second accumulator.

15. The method according to claim 14, wherein said summing further comprises:
   (iii) continuing to increment over said image window until all the pixels of the image window are read; and
   (iv) calculating and writing said result as a final result for the image window.

16. The method according to claim 15, wherein the final results for said functions are available at the same time to a plurality of driver assistance systems.

17. The method according to claim 13, wherein said image window includes a plurality of image windows, wherein said image windows are of different size.

18. The method according to claim 13, wherein said image window includes a plurality of image windows, wherein said image windows overlap.

19. The system of claim 13, wherein the distinct processes performed over the image window include different said functions.

* * * * *